United States Patent [19]

Larboulette et al.

[11] Patent Number: 5,209,557
[45] Date of Patent: May 11, 1993

[54] PHOTOGRAPHIC LIGHT

[75] Inventors: Jean-Philippe Larboulette, Allschwil; Walter Haberthür, Hofstetten, both of Switzerland

[73] Assignee: Bron Elektronik AG, Allschwil, Switzerland

[21] Appl. No.: 895,174

[22] Filed: Jun. 5, 1992

Related U.S. Application Data

[63] Continuation of Ser. No. 590,083, Sep. 28, 1990, abandoned.

[30] Foreign Application Priority Data

Sep. 30, 1989 [DE] Fed. Rep. of Germany ... 8911689[U]

[51] Int. Cl.$^5$ .............................................. G03B 15/02
[52] U.S. Cl. ........................................ 362/11; 362/16; 362/18; 362/240; 362/244
[58] Field of Search ............... 362/3, 11, 12, 13, 16, 362/17, 18, 228, 236, 240, 241, 243, 244, 245, 246, 250, 251, 247

[56] References Cited

U.S. PATENT DOCUMENTS

| | | | |
|---|---|---|---|
| 1,321,521 | 11/1919 | Green | 362/17 |
| 3,135,471 | 6/1964 | Clapp | 362/245 |
| 3,251,985 | 5/1966 | Krupnik | 362/250 |
| 3,643,079 | 2/1972 | Glickman | 362/251 |
| 4,404,619 | 9/1983 | Ferguson | 362/251 |
| 4,475,146 | 10/1984 | Wally, Jr. | 362/11 |
| 4,511,953 | 4/1985 | Fage | 362/250 |
| 4,514,794 | 4/1985 | Haberthür-Heilig | 362/439 |
| 4,570,204 | 2/1986 | Caimi | 362/17 |
| 4,678,336 | 7/1987 | Tsunoda | 362/11 |
| 4,692,844 | 9/1987 | Galerne | 362/372 |
| 4,760,498 | 7/1988 | Lang et al. | 362/17 |
| 4,788,628 | 11/1988 | Farrall | 362/18 |

FOREIGN PATENT DOCUMENTS

| | | | |
|---|---|---|---|
| 8810381 | 9/1988 | Fed. Rep. of Germany . | |
| 837569 | 2/1939 | France | 362/244 |
| 1047603 | 11/1966 | United Kingdom | 362/12 |

Primary Examiner—Richard R. Cole
Assistant Examiner—Y. Quach
Attorney, Agent, or Firm—Robert W. Becker & Associates

[57] ABSTRACT

A photographic light comprises a main reflector with a light aperture, which is closed by a diffuser, and light sources, arranged in the photographic light casing and emitting luminous rays that reach the diffuser. A portion of the diffuser is exposed to the luminous rays of at least one second light source which reach the diffuser in addition to the luminous rays of at least one first light source. The additional second light source creates an area of increased light concentration at the diffuser. During the photographic step the photographic light is arranged such that the mat gloss objects to be photographed are positioned in the area of the increased light concentration, thereby generating strong reflections at the mat gloss surfaces, which are easily discernable from the surrounding areas.

9 Claims, 2 Drawing Sheets

PHOTOGRAPHIC LIGHT

This application is a continuation of application Ser. No. 590,083 filed Sep. 28, 1990 now abandoned.

BACKGROUND OF THE INVENTION

The present invention relates to a photographic light having a main reflector that has a light aperture closed by a diffuser onto which luminous rays are emitted by a first light source that is arranged in a casing.

Photographic lights of the aforementioned type are constructed such that their light aperture is illuminated completely and evenly so that a reflection of a glossy part of the object to be photographed will be evenly illuminated. Such areal photographic lights are especially useful for the photography of high-gloss parts, for example, car body parts, armatures and fixtures, bottles, glasses etc. If these photographic lights, however, are used for the photography of objects with a mat gloss such as fruits, for example, the resulting reflection on these objects is not strong enough, i.e., it is not discernable from the surrounding areas.

It is therefore an object of the present invention to provide a photographic light for the photography of objects with a mat gloss, that will generate reflections on these objects that are clearly discernable from the surrounding areas.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
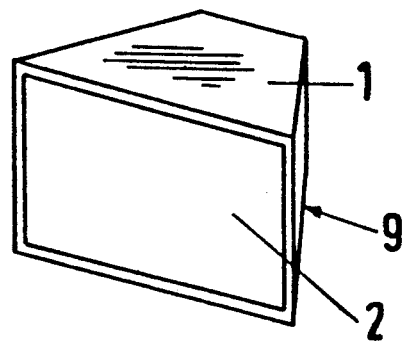
FIG. 1 is a perspective schematic representation of an areal photographic light of the present invention.

The photographic light of the present invention is primarily characterized by comprising at least one second light source, luminous rays of which reach a portion of a diffuser in addition to luminous rays of at least one first light source.

In the photographic light of the present invention the light aperture or the diffuser are not evenly illuminated, because, due to the second light source, an area of increased light concentration is created at the diffuser. During the photographic step the photographic light is arranged such that the mat gloss object to be photographed is placed in the area of increased light concentration, whereby strong reflections occur even on the mat gloss surfaces, which are then clearly discernable from the surrounding areas. The photographic light of the present invention thereby assures optimized photographs of such mat gloss objects.

It is advantageous to provide a reflector at the second light source in order to achieve a high intensity in the area of the high light concentration.

In order to vary the diameter and/or the intensity of the light concentration, the reflector may be focusable and/or exchangeable. It is thereby possible to adjust the photographic light to various photographic requirements.

The reflector may be arranged inside or outside the main reflector. When the reflector is arranged outside the main reflector, it may be exchanged easily.

In order to be able to use the photographic light for even as well as uneven illumination, the first and the second light sources are independently switchable. If it is desired to illuminate the light aperture of the areal photographic light evenly, only the conventional first light sources are switched on, but not the additional second light source. With this arrangement the photographic light is suitable of the photography of high gloss parts. If it is desired to illuminate mat gloss objects with this photographic light, the second light source is also switched on, whereby the area of higher light concentration is created.

To achieve an optimized light yield, the reflector is arranged preferably on a side of the second light source that is remote from the diffuser.

It is advantageous to arrange the second light source centered on a wall of the photographic light opposite the diffuser.

DESCRIPTION OF PREFERRED EMBODIMENTS

The present invention will now be described in detail with the aid of several specific embodiments utilizing FIGS. 1 through 4.

The areal photographic light comprises a conventional main reflector 1 and is equipped wit a light aperture 7 which is closed by a diffuser 2. Inside the main reflector, on a back wall 8 of the reflector casing 9 opposite the diffuser 2, the light sources 3 are arranged, which allow for an even light density at the diffuser 2. These light sources 3 are therefore distributed such that an even light density is assured. The light sources 3 may be provided with counter reflectors 4 (FIG. 3) which may be arranged between the respective light source 3 and the diffuser 2, as known from U.S. Pat. No. 4,760,498. These counter reflectors 4 may also be employed to achieve an even light density at the diffuser 2.

With the light sources 3 and the optional counter reflectors 4 the light aperture 7 is evenly and completely illuminated. This is necessary in order to create an uneven illumination of the reflection of a glossy part of an object to be photographed. This is especially important for photographing high gloss parts, for example, car body parts, armatures and fixtures, bottles, glasses, etc. When mat gloss objects such as fruits are photographed, then, depending on the surface, the reflections on these objects are too weak, i.e, the intensities of the reflections are not discernable from the intensities of the surrounding areas. It is, however, desirable, to enhance the reflections of such mat gloss objects. But, for this purpose, a photographic light with a light aperture that illuminates evenly and completely is not suitable.

Therefore, the areal photographic light of the present invention is provided with a means to create intense reflections on mat gloss objects which are easily discernable from the surrounding areas. Inside the areal photographic light a second light source 5 is arranged (FIGS. 3 and 4) which emits luminous rays onto the diffuser 2. Within the emission area of the additional second light source 5 the illumination of the diffuser 2 is thereby increased. It is advantageous to arrange the second light source 5 centered on the back wall 8 of the photographic light so that a light concentration occurs in the center of the diffuser 2. Accordingly, the second light source 5 may be switched on when mat gloss objects are to be photographed. In this case an increased light intensity results at the diffuser 2 in the direction of the emission area of the light source 5. When the light source 5 is centered on the back wall 8, then the increased light concentration occurs at the center of the diffuser 2, whereby an increased light intensity is created in the direction of the center of the diffuser 2. The degree of the light concentration in the center of the diffuser depends on the properties of the surfaces to be photographed. It is therefore desirable to be able to vary the diameter and/or the intensity of the area of the increased light concentration.

Figure 2:
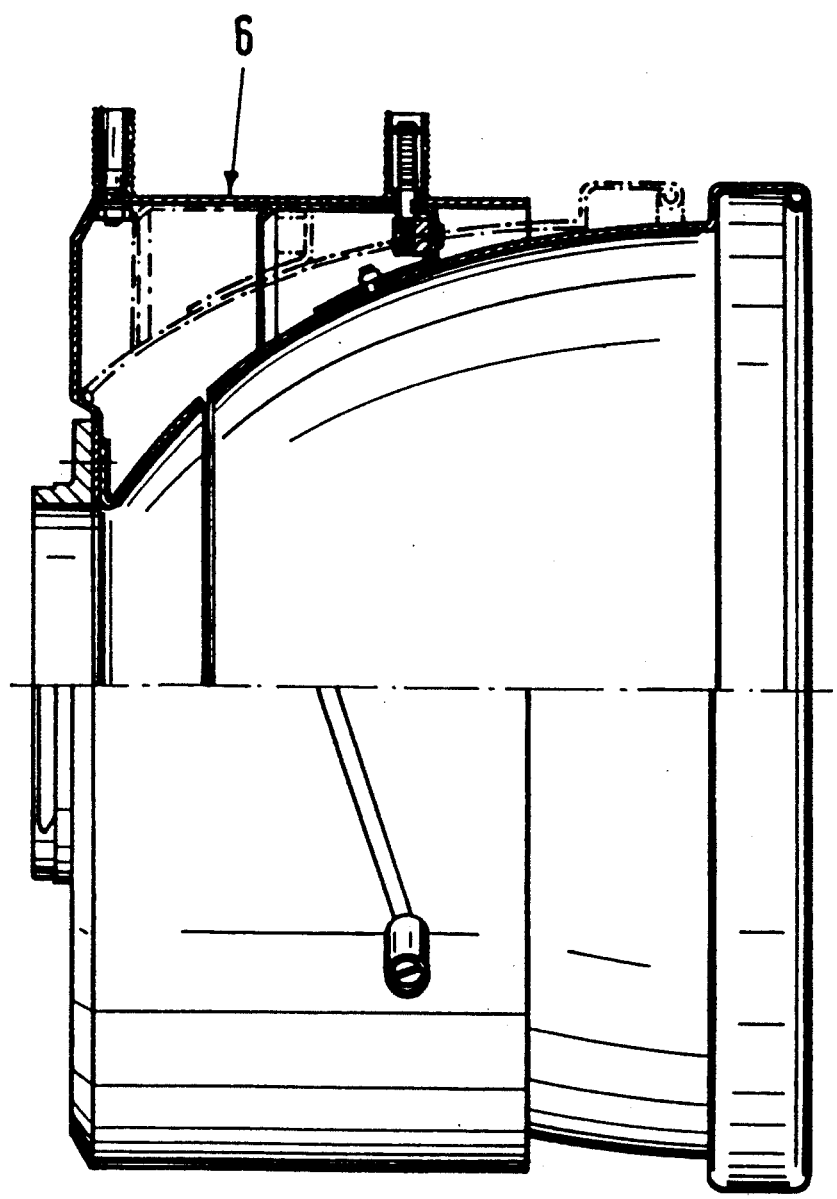
FIG. 2 is an enlarged cross-sectional view of a focusable and each angeable reflector arranged in the photographic light according to FIG. 1.
Figure 3:
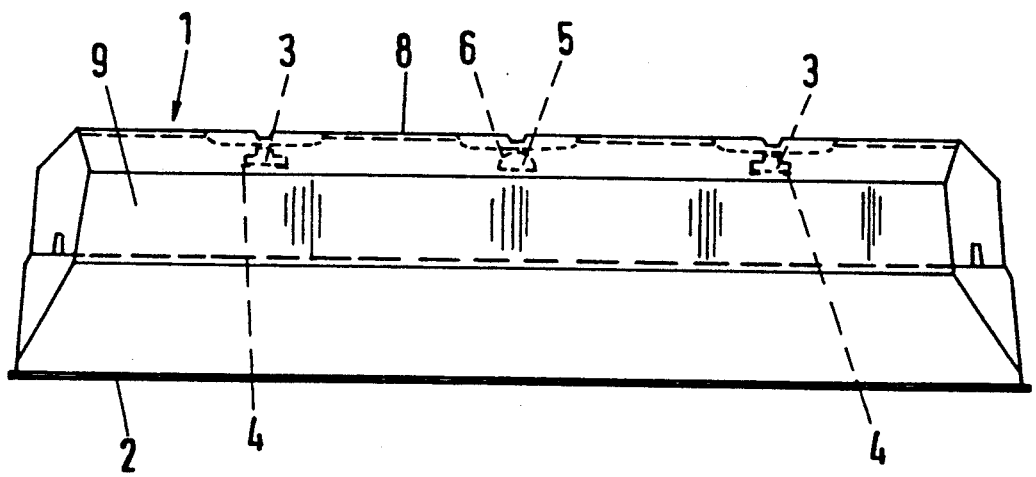
FIG. 3 is a top-view of the photographic light according to FIG. 1.
Figure 4:
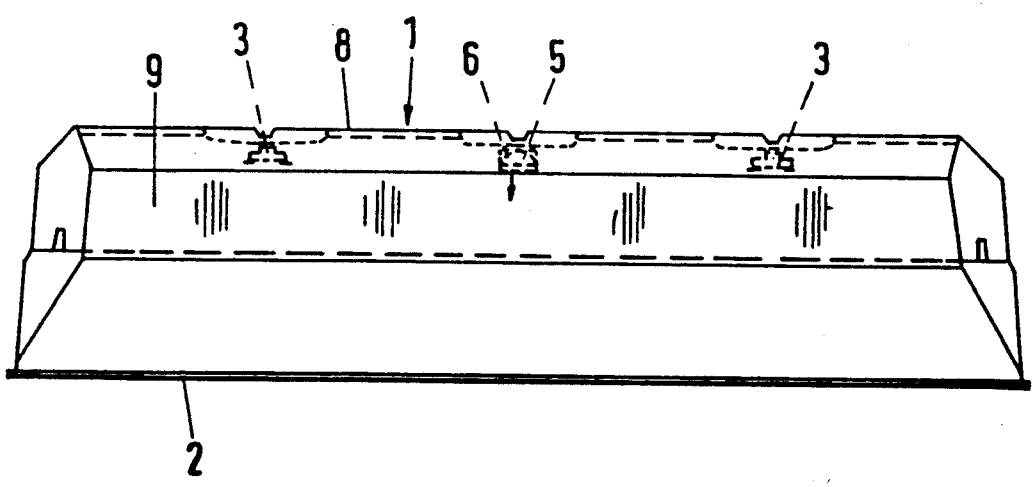
FIG. 4 shows a second embodiment of an areal photographic light of the present invention in a view according to FIG. 3.

In order to achieve a high light concentration at the diffuser 2, the second light source 5 is partially surrounded by a reflector 6 (FIG. 3), which, in this preferred embodiment, is arranged inside the areal photographic light. With this reflector 6, it is possible to create a so-called hot spot at the diffuser 2, i.e., an area with an increased light concentration. Depending on the aperture angle of the reflector, the area of the increased light concentration may be varied in its diameter and also in its intensity. This reflector 6 may be focusable in a usual fashion (DE-GM 88 10 381), so that the diameter of the area of the light concentration may be adjusted in a simple manner (FIGS. 2 and 4). When the luminous rays of the light source 5 are strongly focused by the reflector 6, the area of the light concentration has a small diameter, but the light intensity is high. On the other hand, when the luminous rays emitted by the light source 5 are less focused, the area of the light concentration is increased, while the light intensity in this area is reduced.

The reflector 6 may also be exchangeable, as known from U.S. Pat. No. 4,514,794. Depending on the photographic requirements, various reflectors 6 may then be arranged inside the areal photographic light. This also allows for an easy adjustment of the size and the intensity of the area of the light concentration according to the photographic requirements.

The reflector 6 may also be arranged outside the main reflector 1, which allows for an especially easy exchange of the reflector 6, if necessary.

It is also possible, to vary the current applied to the light source 5, whereby different light intensities may be achieved also. Therefore, by a suitable adjustment and/or selection of the reflector 6 and/or variation of the applied current, the light intensity and the size of the area of the light concentration may be optimized according to the photographic requirements.

As shown in the drawings, the counter reflectors 4 are provided between the respective light sources 3 and the diffuser 2. The reflector 6, on the other hand, is arranged in the area between the light source 5 and the back wall 8. By varying the aperture angle of the reflector 6, as described in DE-GM 88 10 381, the area of the increased light concentration may be adjusted.

The areal photographic light may also be equipped with more than one second light source 5 in order to achieve a higher light concentration and/or a greater area of light concentration. These various light sources 5 may be arranged such that their luminous rays reach a common area on the diffuser 2. However, it is also possible to create different areas of increased light concentration by having the luminous rays of the light sources 5 reach different areas of the diffuser 2. In this case, different objects may be illuminated by the areal photographic light at the same time so that the desired strong reflection occur at respective areas of the different objects. Preferably, the various second light sources 5 are independently switchable, so that the areal photographic light may be employed for varying photographic situations and requirements.

The additional second light source(s) 5 is (are) switchable independent from the first light sources 3 in order to create, by choice, an even or an uneven light distribution with the areal photographic light of the present invention.

The present invention is, of course, in no way restricted to the specific disclosure of the specification, examples and drawings, but also encompasses any modifications within the scope of the appended claims.

What we claim is:

1. A photographic light having a main reflector that is disposed in a casing and has a light aperture closed by a diffuser onto which luminous rays are emitted by first light sources that are arranged within said main reflector, said photographic light further comprising at least one second light source that is disposed within said casing, with luminous rays of said second light source reaching a portion of said diffuser in addition to luminous rays of at least one of said first light sources, with said diffuser being irregularly illuminated by said light sources first and said at least one second light source.

2. A photographic light according to claim 1, in which a further reflector is provided at said second light source.

3. A photographic light according to claim 2, in which said further reflector is focusable.

4. A photographic light according to claim 2, in which said further reflector is exchangeable.

5. A photographic light according to claim 2, in which said further reflector is arranged inside said main reflector.

6. A photographic light according to claim 2, in which said further reflector is arranged on a side of said second light source, said side being remote from said diffuser. said diffuser.

7. A photographic light according to claim 1, in which said second light source and said first light sources are independently switchable.

8. A photographic light according to claim 1, in which said second light source is centered on a wall of said photographic light, which wall is opposite said diffuser.

9. A photographic light having a main reflector that is disposed in a casing and has a light aperture closed by a diffuser onto which luminous rays are emitted by first light sources that are arranged within said main reflector, said photographic light further comprising at least one second light source that is disposed within said casing, with luminous rays of said at least one second light source reaching a portion of said diffuser in addition to luminous rays of at least one of said first light sources, with said diffuser being irregularly illuminated by said first light sources and said second light source, and with said at least one further reflector being arranged on a sida of said at least one second light source, said side being remote from said diffuser.

* * * * *